United States Patent
Jayaprakash et al.

(10) Patent No.: US 11,016,464 B2
(45) Date of Patent: May 25, 2021

(54) SYSTEM AND METHOD FOR EFFICIENT VERIFICATION OF BUILDING AUTOMATION SYSTEMS

(71) Applicant: Tata Consultancy Services Limited, Mumbai (IN)

(72) Inventors: Rajesh Jayaprakash, Chennai (IN); Srinarayana Nagarathinam, Chennai (IN); Supriya Agrawal, Pune (IN); Ramasubramanian Suriyanarayanan, Chennai (IN); Anand Sivasubramaniam, Chennai (IN)

(73) Assignee: Tata Consultancy Limited Services, Mumbai (IN)

( * ) Notice: Subject to any disclaimer, the term of this patent is extended or adjusted under 35 U.S.C. 154(b) by 99 days.

(21) Appl. No.: 16/506,673

(22) Filed: Jul. 9, 2019

(65) Prior Publication Data

US 2020/0064800 A1 Feb. 27, 2020

(30) Foreign Application Priority Data

Aug. 24, 2018 (IN) .............................. 201821031793

(51) Int. Cl.
  *G05B 19/00* (2006.01)
  *G05B 19/048* (2006.01)
(52) U.S. Cl.
  CPC .. *G05B 19/048* (2013.01); *G05B 2219/25423* (2013.01); *G05B 2219/2614* (2013.01)
(58) Field of Classification Search
  CPC ........ G05B 19/048; G05B 2219/25423; G05B 2219/2614; G05B 2219/2642; G05B 15/02
  See application file for complete search history.

(56) References Cited

U.S. PATENT DOCUMENTS

| | | | |
|---|---|---|---|
| 6,366,832 B2 | 4/2002 | Lomonaco et al. | |
| 9,390,388 B2 | 7/2016 | Drees et al. | |
| 9,429,927 B2 | 8/2016 | Nesler et al. | |
| 9,778,639 B2 | 10/2017 | Boettcher et al. | |
| 10,162,739 B2 * | 12/2018 | Matsubara | G06F 11/3608 |

(Continued)

OTHER PUBLICATIONS

Kormann, Benjamin, and Birgit Vogel-Heuser. "Automated test case generation approach for PLC control software exception handling using fault injection." IECON 2011—37th Annual Conference of the IEEE Industrial Electronics Society. IEEE, 2011. (Year: 2011).*

(Continued)

*Primary Examiner* — Michael D Masinick
(74) *Attorney, Agent, or Firm* — Finnegan, Henderson, Farabow, Garrett & Dunner

(57) ABSTRACT

This disclosure relates generally to a system and method to identify at least one conflict and for controlling both static and dynamic variables in one or more operations of at least one subsystem of a plurality of building automation subsystems. It includes a supervisory control layer that orchestrates multiple underlying sub-systems like heating, ventilation, and air-conditioning (HVAC) sub-systems and at least one access control sub-system. A test case generation framework is used to verify static and dynamic variables of operations of the sub-systems. It identifies conflicts in the static and dynamic variables. Therefore, the system provides controls to the sub-systems using the identified and adjusted conflict of static and dynamic variables on operations.

7 Claims, 3 Drawing Sheets

(56) References Cited

U.S. PATENT DOCUMENTS

| 10,371,405 B2* | 8/2019 | Albonesi | F24F 11/70 |
| 2010/0257505 A1* | 10/2010 | Hinchey | G06F 8/10 |
| | | | 717/101 |
| 2011/0178977 A1 | 7/2011 | Drees | |
| 2016/0055077 A1* | 2/2016 | Baloch | G06F 11/3692 |
| | | | 714/38.1 |
| 2016/0371167 A1* | 12/2016 | Manolios | G06F 30/3323 |
| 2018/0209675 A1* | 7/2018 | Ridder | F24F 11/46 |

OTHER PUBLICATIONS

Liu, Hui, and Hee Beng Kuan Tan. "Automated verification and test case generation for input validation." Proceedings of the 2006 international workshop on Automation of software test. 2006. (Year: 2006).*

Brucker et al, Framework, An Interactive Test-case Generation. "HOL-TestGen.", 2009 (Year: 2009).*

Sun, Yan, et al. "A rule verification system for smart buildings." IEEE Transactions on Emerging Topics in Computing 5.3 (2016): 367-379. (Year: 2016).*

* cited by examiner

SYSTEM AND METHOD FOR EFFICIENT VERIFICATION OF BUILDING AUTOMATION SYSTEMS

PRIORITY CLAIM

This U.S. patent application claims priority under 35 U.S.C. § 119 to: India Application No. 201821031793, filed on Aug. 24, 2018. The entire contents of the aforementioned application are incorporated herein by reference.

TECHNICAL FIELD

This disclosure relates generally to the field of building automation subsystems, and, more particularly, to a system and method for verification correctness of logic input used by building operators for controlling the behavior of various heating, ventilation and air conditioning (HVAC) sub-systems.

BACKGROUND

Building automation systems (BAS) form an integral part of the smart infrastructure ecosystem, and helps in realizing the intelligence necessary to make building meet their comfort, efficiency, and environment-related goals. Usually, building automation systems (BAS) include a supervisory control layer that orchestrates multiple underlying sub-systems like heating, ventilation and air-conditioning (HVAC) sub-systems and access control sub-systems. This supervisory control layer logic and its intelligence is typically implemented in the form of configurable logic expressed as a sequence of 'if then' rules, which leverage data from multiple systems for this.

These rules are quite often given by operators. Though, they are possessing operational knowledge and an intuitive or heuristic understanding of the system behavior, however, they may not be experts in the respective domains. Further, these rules may be given by multiple persons and that could lead to conflict in the rules (two rules that activate the devices in a contradictory manner at the same time). Hence, it may violate constraints with respect to the occupants' comfort and also adversely effect on the equipment due to too-frequent duty cycling or adjustment of the devices.

SUMMARY

Embodiments of the present disclosure present technological improvements as solutions to one or more of the above-mentioned technical problems recognized by the inventors in conventional systems. For example, in one embodiment, a method for identifying at least one conflict in one or more static and dynamic variables in one or more operations of a HVAC sub-system is provided. In another embodiment, a system is configured to identify at least one conflict in one or more static and dynamic variables in one or more operations of a HVAC sub-system is provided. The system includes at least one memory and one or more hardware processors which are communicatively coupled with the at least one memory to execute the plurality of instructions of the at least one memory. A test case generation framework of the system is used to verify one or more static and dynamic variables of one or more operations of the at least one subsystem. The test case generation framework identifies at least one conflict in the one or more static and dynamic variables which is adjusted based on predefined rules and conditions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
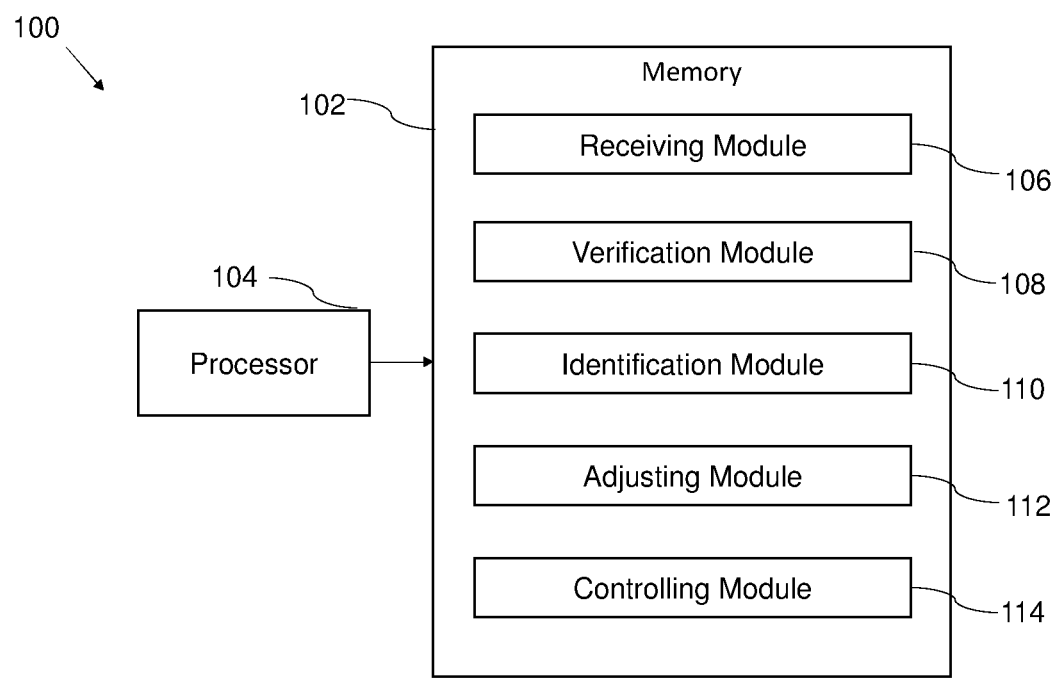
FIG. 1 illustrates an exemplary title system to identify at least one conflict in the static and dynamic variables in one or more operations of at least one subsystem according to some embodiments of the present disclosure.
Figure 2:
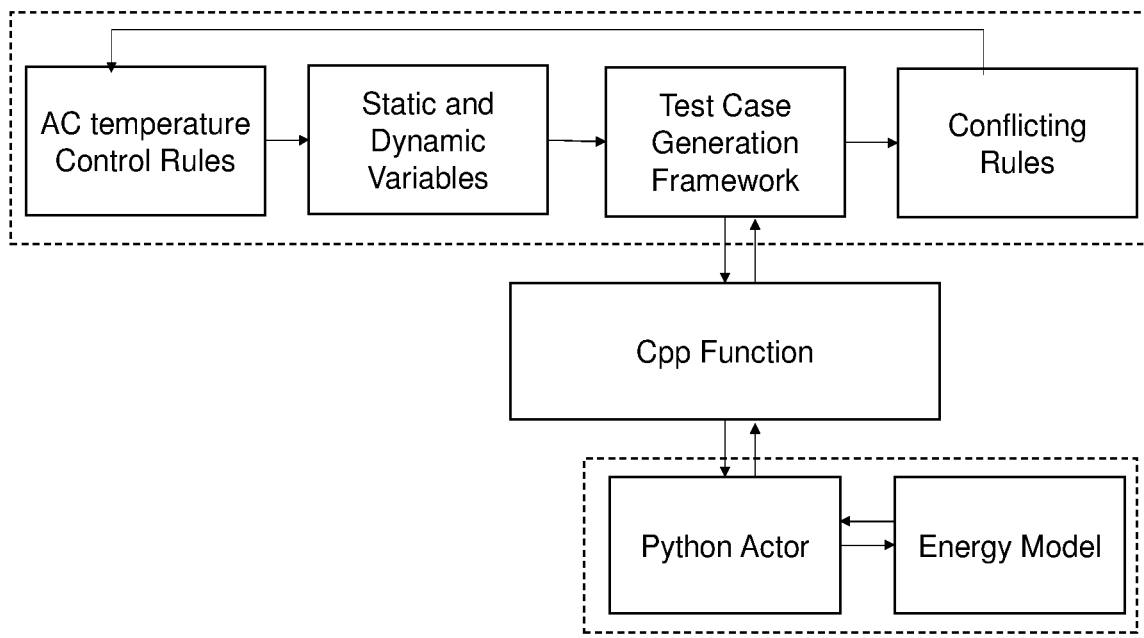
FIG. 2 is a functional block diagram according to some embodiments of the present disclosure.
Figure 3:
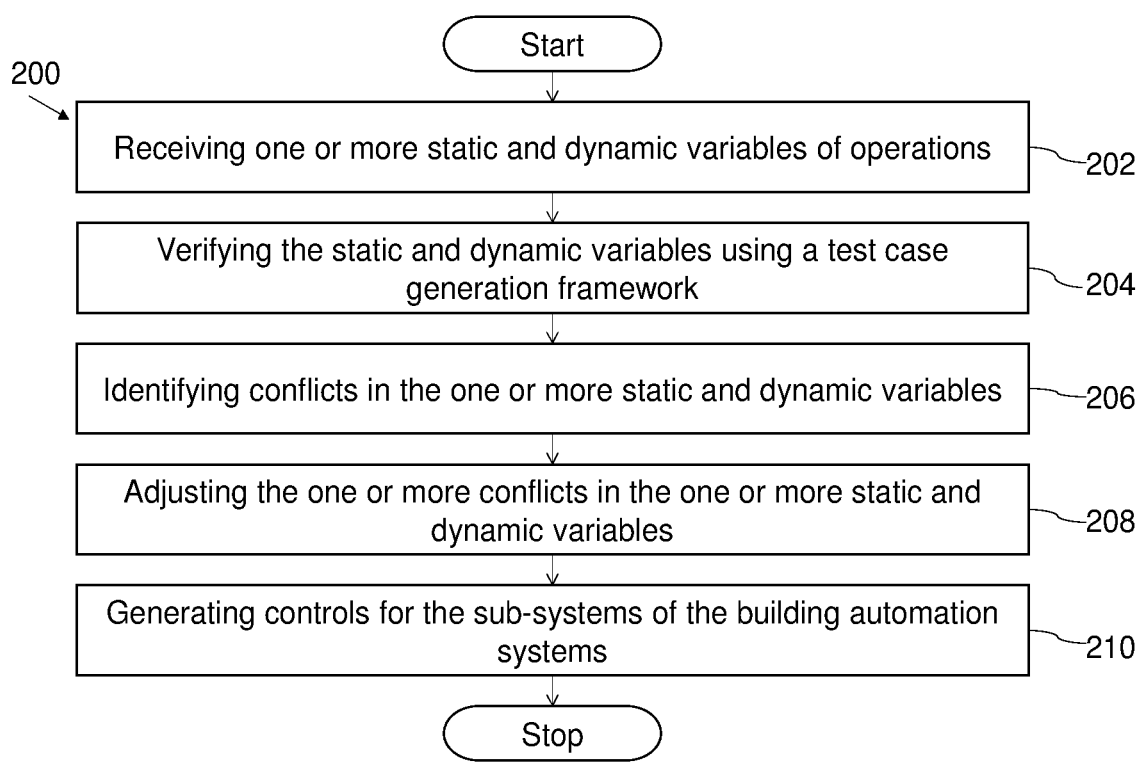
FIG. 3 is a flow diagram illustrating a method to identify at least one conflict in the static and dynamic variables in one or more operations of at least one subsystem in accordance with some embodiments of the present disclosure.

Referring now to the drawings, and more particularly to FIG. 1 through 3, where similar reference characters denote corresponding features consistently throughout the figures, there are shown preferred embodiments and these embodiments are described in the context of the following exemplary system and/or method.

Referring FIG. 1, illustrating a system (100) which is configured to identify at least one conflict and for controlling both static and dynamic variables in one or more operations of at least one subsystem. The system (100) includes a supervisory control layer that orchestrates multiple underlying sub-systems like heating, ventilation, and air-conditioning (HVAC) sub-systems and a set of access control sub-systems. Herein, the system (100) comprising at least one memory (102) storing a plurality of instructions, one or more hardware processors (104) communicatively coupled with the at least one memory (100). A receiving module (106) of the system (100) is configured to receive one or more static and dynamic variables of one or more operations of the at least one subsystem. A verification module (108) of the system (100) is configured to verify the received one or more static and dynamic variables of the one or more operations using a test case generation framework and identifying at least one conflict in the one or more static and dynamic variables of one or more operations. Therefore, a controlling module (114) of the system (100) is configured to provide one or more controls to the at least one subsystem using the identified and adjusted one or more static and dynamic variables.

In the preferred embodiment, a receiving module (106) of the system (100) is configured to receive one or more static and dynamic variables of one or more operations of the at least one sub-system within an establishment. The one or more static variables of one or more operations depends on occupancy count and ambient temperature of the establishment and a return air temperature of an AHU fan of the establishment. The one or more dynamic variables of the one or more operations includes the energy consumption of the establishment which is exceeding a predefined baseline value at the close of a business day.

In one example, where a room comfort air temperature set-point is met through either an AHU supply fan or variable-air-volume sub-systems. In both these sub-systems the flowrate of the supply air into the room is modulated to meet the set-point. Normally, the room air temperature is used as proxy for thermal comfort, although other factor such as humidity, local air velocity, mean radiant temperature and occupant related parameter may be important. A base controller is usually a proportional-integrated-derivative (PID) type that tries to minimize the error between the room temperature and a pre-defined set-point, within some dead-band, selected based on recommendations from standards such as American Society of Heating, Refrigerating and Air Conditioning Engineers (ASHRAE) standard 55 for occupant thermal comfort. It may be noted that ASHRAE recommends cooling and heating operative temperature set-points in the range 23-26 degree Celsius and 20-24 degree Celsius respectively. It would be appreciated that each AHU has a dedicated and independent controller that tries to match the return air temperature (RAT) with the set point. The controller generally has a dead-band around the set-point, typically plus-minus one degree Celsius. A user defined rules layer sits on the top of this PID controller such that when none of the rules is firing, the PID controller modulates the flowrate. It would be noted that the rules conflict frequently leading to cycling of the AHU supply fan flowrate and thus increase in power consumption. Although, the occupant comfort is still within the acceptable range, the oscillatory behavior led to an overall increase in the electrical consumption. Hence, the frequent cycling of the supply fan defeats the purpose of the PID controller which otherwise give smooth operating profile and may give rise to the AHU fan stability issues requiring frequent maintenance.

In the preferred embodiment, a verification module (108) of the system (100) is configured to verify the received one or more static and dynamic variables using a test case generation framework. The analysis helps in identifying at least one conflict in the received one or more static and dynamic variables.

Referring table 1, illustrating a subset of typical rules written to control the flow rate of the air handling unit of an HVAC sub-system. The rules are scheduled to run at periodic intervals and depending on whether the conditions mentioned are met, and it will change the flow rate of the AHU fan accordingly. A static rule conflict may cause more than one rule to fire at the same time and that may lead to set the flowrate variable to different values. If conflict is of dynamic in nature the energy consumption of the building may exceed a baseline value at the close of a business day. Further herein, the identified one or more static and dynamic variables may comprise at least one variable of energy storage tank and at least one variable of energy transfer rates out of thermal energy storage tank.

TABLE 1

IF occupancyCount >0 and ambientTemp> returAirTemp THEN flowRate = MAX
IF occupancyCount > 0 and returnAirTemp > SetPoint THEN flowRate = MAX
IF occupancyCount > 0 and returnAirTemp < SetPoint THEN flowRate = MAX/4
IF occupancyCount > 0 and ambientTemp = SetPoint THEN flowRate = MAX/2
IF StartOfWorkingHours − currentTime= 30   THEN flowRate = MAX
IF endOfWorkingHours − currentTime= 30           THEN flowRate = 0

In the preferred embodiment, an identification module (110) of the system (100) is configured to identify at least one conflict in the received one or more static and dynamic variables. It would be appreciated that the error between a room temperature and a pre-defined set-point within a dead-band, is defined based on recommendations from standards, such as American Society of Heating, Refrigerating and Air Conditioning Engineers (ASHRAE). A base controller usually a proportional-integrated-derivative (PID) type is used to minimize the identified error.

It is noted that the test case generation framework is in a form of a decision table which reflects a user friendly tabular notation to formally specify requirement of at least one sub-system. Further, it is used to express one or more requirements in a form of inputs and outputs. It provides a uniform notation to specify both state based and sequence based one or more requirements. Further herein, the test case generation framework in the tabular notation can combine formal semantic and user friendliness. It could be easier to edit when compared with textual, graphical or logical notations especially for specifying state based requirements. The syntax and semantics of the test case generation framework is designed with active feedback from testers so that the end specification is compact and close to informal requirements. In addition to generating test cases the test case generation framework also generates input variables in real time patterns.

Referring table 2, as an example, showing a generated test case, wherein conflict is raised at time 2. If the default values of desired temperature and occupancy count are 22 and 0 respectively. The return air temperature (RTE) is calculated by the function calcRTE ( ) when row 1 matches. At time 2, value of occupancy count (OpCnt) is 5 that matches both rows 2 and 3. Also RTE is calculated as 24.5, which is less than desired temperature. Second input of row 3 also matches. Since all inputs of rows 2 and 3 matches, both rows will generate output,

TABLE 2

| Time(Min) | Input Signals | Output Signals | Remarks |
| --- | --- | --- | --- |
| 0 | OpCnt = 0 | | |
| 1 | OpCnt = 20 | | |
| | | CurrTime = 1 | Row 1 output |
| | | RTE = 25 | Row 1 output |
| | | FlowRate = MAX | Row 3 output |
| 2 | OpCnt = 5 | | |
| | | CurrTime = 2 | Row 1 output |
| | | RTE = 24.5 | Row 1 output |
| | | FlowRate = MAX | Row 2 output |
| | | FlowRate = 0 | Row 3 output | thus the conflict.

In the preferred embodiment, an adjusting module (112) of the system (100) is configured to adjust the at least one identified conflict in the one or more static and dynamic variables of the one or more operations of the sub-system. It would be appreciated that the test case generation framework is integrated with a building energy model using a co-simulation paradigm. Since both test case generation framework and the building energy model are running independently, totally unaware of each other, passing correct variables at correct time to both is very critical to achieve mutual exclusion.

In an example, wherein test case1 (TC1) is generated by executing one test case generation framework as decision table 1 (DT1) and test case2 (TC2) is generated by executing another test case generation framework as decision table 2 (DT2). In the TC1, there are two variables that are conflicting namely O1 and O2. In the O1 conflict, three rows (1, 2, and 3) are conflicting. Since the DT1 processes the last value in case of conflict, the final value of O1 is 10 in the TC1 (generated by row 3). Further, the row 4 of the TC1 is matched by the value of B and O2 and its value is generated as 50. Based on the O1, the next row that matches is row 6 of the TC1 which generates O2 equal to 60. Thus, the conflict occurs in O2 for row pair {4,6} and value of O2 is 60. It would be appreciated that there are three pairs of row causing conflicts for O1 that can be flipped such as {1, 2}, {2, 3}, and {1, 3}. Usually, a pair is selected based on frequency of its occurring in the test cases. Herein, it shows only three pairs and all are different, so a random pair is selected i.e. {2, 3}. Once, the sequence of the rows are flipped the test case2 is obtained. In the DT2, row 2 of DT1 becomes row 3 and when executed for the same inputs, output is getting changed. Similarly, by changing value of O1 the value of O2 will change accordingly.

TABLE 3

Decision Table 1 (DT1)

| | Inputs | | | Outputs | |
|---|---|---|---|---|---|
| S. No. | A | B | O1 | O2 | O1 |
| 1 | >0 | | | | 0 |
| 2 | >5 | | | | 5 |
| 3 | >10 | | | | 10 |
| 4 | | 0 | | 50 | |
| 5 | | | 5 | O1 + 50 | |
| 6 | | | 10 | O1 + 50 | |

Test case 1 (TC1)

| Time | Inputs | Outputs | Row matched |
|---|---|---|---|
| 0 | B = 0 | | |
| 0 | A = 15 | | |
| | | O1 = 0 | 1 |
| | | O1 = 5 | 2 |
| | | O1 = 10 | 3 |
| | | O2 = 50 | 4 |
| | | O2 = 60 | 6 |

Decision Table 2 (DT2)

| S. No. | A | B | O1 | O2 | O1 |
|---|---|---|---|---|---|
| 1 | >0 | | | | 0 |
| 2 | >10 | | | | 10 |
| 3 | >5 | | | | 5 |
| 4 | | 0 | | 50 | |
| 5 | | | 5 | O1 + 50 | |
| 6 | | | 10 | O1 + 50 | |

TABLE 3-continued

Test case 2 (TC2)

| 0 | B = 0 | | |
|---|---|---|---|
| 0 | A = 15 | | |
| | | O1 = 0 | 1 |
| | | O1 = 10 | 2 |
| | | O1 = 5 | 3 |
| | | O2 = 50 | 4 |
| | | O2 = 55 | 5 |

In another embodiment, wherein the test case generation framework generates the variables occupancy count and ambient temperature and estimates the value of flowrate according to the rules using the return air temperature given by energy model. The return air temperature is calculated by the energy model based on the value of these three variables and previous value of return air temperature.

In an example, where at any time $t_x$ the energy model will acquire lock and use the values of variables at time $t_{x-1}$ and compute return air temperature that will be written in a shared memory and passed to test case generation framework. The test case generation framework will read the values at time $t_x$ which will be used later at time $t_{x+1}$ and release the lock, maintaining write followed by read approach.

In the preferred embodiment, a controlling module (114) of the system (100) is configured to provide one or more controls to the at least one sub-system using the identified one or more static and dynamic variables.

Referring FIG. 2, as an example, wherein a Building Controls Virtual Test Bed (BCVTB) framework for Energy Plus is shown, which helps in integrating the Energy Plus with various software and simulating the full integration. A python has a package that has APIs for integrating with Energy Plus via BCVTB. The test case generation framework does not allow to directly call python functions. Therefore, integration of the test case generation framework with the python is arranged with function CalcRTE which was called by the test case generation framework. Further, the test case generation framework generates the variables occupancy count and ambient temperature and estimates the value of flowrate according to rules using the return air temperature given by the Energy Plus. The return air temperature is calculate by the Energy Plus based on the value of these three variables and previous value of return air temperature. So, there is a continuous loop of interaction between the test case generation framework and the Energy Plus.

Referring FIG. 3, a processor-implemented method (200) to identify at least one conflict and for controlling both static and dynamic variables in one or more operations of at least one subsystem.

Initially, at the step (202), one or more static and dynamic variables of one or more operations of at least one sub-system of an establishment are received at a receiving module (106) of the system (100). The one or more static variables of one or more operations depends on occupancy count and ambient temperature of the establishment and a return air temperature of an AHU fan of the establishment. The one or more dynamic variables of the one or more operations includes the energy consumption of the establishment which is exceeding a predefined baseline value at the close of a business day.

At the next step (204), the received one or more static and dynamic variables are verified at a verification module (108) of the system (100) using a test case generation framework.

The analysis helps in identifying at least one conflict in the received one or more static and dynamic variables.

At the next step (206), at least one conflict in the one or more static and dynamic variables is identified at an identification module (110) of the system (100).

At the next step (208), adjusting the at least one identified conflict in the one or more static and dynamic variables of the one or more operations of the sub-system at an adjusting module (112) of the system (100).

Finally, at the last step (210), one or more controls are generated at a controlling module (114) of the system (100) using the adjusted one or more static and dynamic variables.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of conflict in the rules that activate the sub-systems of the building automation systems in a contradictory manner at the same time. The embodiment, thus provides a system and method to identify at least one conflict and for controlling both static and dynamic variables in one or more operations of at least one sub-system.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system comprising:
   at least one memory storing a plurality of instructions;
   one or more hardware processors communicatively coupled with the at least one memory, wherein the one or more hardware processors are configured to execute modules;
   a receiving module configured to receive variables of one or more operations of at least one subsystem within an establishment, wherein the variables of the one or more operations of the at least one subsystem comprises of occupancy count, an ambient temperature of the establishment, a return air temperature of an AHU fan of the establishment and an AHU supply fan flowrate;
   a verification module configured to verify one or more rules based on the received variables using a test case generation framework, wherein the test case generation framework is integrated with a building energy model, wherein the test case generation framework estimates the AHU supply fan flowrate using the occupancy count, the ambient temperature of the establishment and the return air temperature of the AHU fan of the establishment, and wherein the return air temperature of the AHU fan of the establishment is provided by the building energy model to the test case generation framework;
   an identification module configured to identify at least one conflict in the verified one or more rules;

an adjusting module configured to adjust the identified at least one conflict in the one or more rules; and a controlling module configured to generate one or more controls to the at least one subsystem using the identified and adjusted one or more rules.

2. The system as claimed in claim 1, wherein the test case generation framework takes a predefined rule file as an input to generate a list of conflicting rules of the one or more operations.

3. The system as claimed in claim 1, wherein the test case generation framework is a decision table using one or more predefined rules and conditions in identifying the at least one conflict.

4. A processor-implemented method comprising:

receiving, via one or more hardware processors, variables of one or more operations of at least one subsystem within an establishment, wherein the variables of the one or more operations of the at least one subsystem comprises of occupancy count, an ambient temperature of the establishment, a return air temperature of an AHU fan of the establishment and an AHU supply fan flowrate;

verifying, via one or more hardware processors, one or more rules based on the received variables of the one or more operations using a test case generation framework, wherein the test case generation framework is integrated with a building energy model, wherein the test case generation framework estimates the AHU supply fan flowrate using the occupancy count, the ambient temperature of the establishment and the return air temperature of the AHU fan of the establishment, and wherein the return air temperature of the AHU fan of the establishment is provided by the building energy model to the test case generation framework;

identifying, via one or more hardware processors, at least one conflict in the verified one or more rules of the one or more operations;

adjusting, via one or more hardware processors, the at least one identified conflict in the one or more rules of one or more operations; and generating, via one or more hardware processors, one or more controls for the at least one subsystem using the identified and adjusted one or more rules.

5. The method as claimed in claim 4, wherein the test case generation framework is a decision table using one or more predefined rules and conditions in identifying at least one conflict in the one or more rules.

6. One or more non-transitory machine readable information storage mediums comprising one or more instructions which when executed by one or more hardware processors cause:

receiving, via one or more hardware processors, variables of one or more operations of at least one subsystem within an establishment, wherein the variables of the one or more operations of the at least one subsystem comprises of occupancy count, an ambient temperature of the establishment, a return air temperature of an AHU fan of the establishment and an AHU supply fan flowrate;

verifying, via one or more hardware processors, one or more rules based on the received variables of the one or more operations using a test case generation framework, wherein the test case generation framework is integrated with a building energy model, and wherein the test case generation framework estimates the AHU supply fan flowrate using the occupancy count, the ambient temperature of the establishment and the return air temperature of the AHU fan of the establishment, and wherein the return air temperature of the AHU fan of the establishment is provided by the building energy model to the test case generation framework;

identifying, via one or more hardware processors, at least one conflict in the verified one or more rules of the one or more operations;

adjusting, via one or more hardware processors, the at least one identified conflict in the one or more rules of one or more operations; and generating, via one or more hardware processors, one or more controls for the at least one subsystem using the identified and adjusted one or more rules.

7. The one or more non-transitory machine readable information storage mediums of claim 6, wherein the test case generation framework is a decision table using one or more predefined rules and conditions in identifying at least one conflict in the one or more rules.

* * * * *